(12) United States Patent
Pazzaglia et al.

(10) Patent No.: US 9,644,902 B2
(45) Date of Patent: May 9, 2017

(54) METHODS FOR REACTING COMPOUNDS

(71) Applicant: MEMC Electronic Materials S.p.A., Novara (IT)

(72) Inventors: Gianluca Pazzaglia, Merano (IT); Matteo Fumagalli, Merano (IT); Rodolfo Bovo, Merano (IT)

(73) Assignee: MEMC Electronic Materials, S.p.A., Novara (IT)

( * ) Notice: Subject to any disclaimer, the term of this patent is extended or adjusted under 35 U.S.C. 154(b) by 792 days.

(21) Appl. No.: 13/857,244

(22) Filed: Apr. 5, 2013

(65) Prior Publication Data

US 2013/0224099 A1 Aug. 29, 2013

Related U.S. Application Data

(62) Division of application No. 13/355,309, filed on Jan. 20, 2012.

(Continued)

(51) Int. Cl.
| | | |
|---|---|---|
| *C01B 33/107* | (2006.01) | |
| *F28F 9/00* | (2006.01) | |
| *B01J 12/00* | (2006.01) | |
| *B01J 19/24* | (2006.01) | |
| *F28D 7/16* | (2006.01) | |
| *F28F 9/22* | (2006.01) | |
| *B01J 8/18* | (2006.01) | |
| *C01B 33/033* | (2006.01) | |

(52) U.S. Cl.
CPC ............... *F28F 9/00* (2013.01); *B01J 8/1836* (2013.01); *B01J 12/00* (2013.01); *B01J 19/24* (2013.01); *C01B 33/033* (2013.01); *C01B 33/1071* (2013.01); *F28D 7/16* (2013.01); *F28F 9/22* (2013.01); *B01J 2219/00081* (2013.01); *F28F 2275/205* (2013.01)

(58) Field of Classification Search
CPC .................................................. C01B 33/1071
USPC .................................................. 423/341, 342
See application file for complete search history.

(56) References Cited

U.S. PATENT DOCUMENTS 3,250,322 A    5/1966  McCrary, Jr. et al.
3,784,361 A *  1/1974  Kubec ................... B01J 8/0005
                                                          422/148

(Continued)

FOREIGN PATENT DOCUMENTS

BE        449817 A      4/1943
DE        3024319 A1    1/1982

(Continued)

OTHER PUBLICATIONS

Non-Final Office Action; U.S. Appl. No. 13/355,303, dated Oct. 9, 2013, pp. 16.

(Continued)

*Primary Examiner* — Jennifer A Leung
(74) *Attorney, Agent, or Firm* — Armstrong Teasdale LLP

(57) ABSTRACT

Shell and tube heat exchangers that include a baffle arrangement that improves the temperature profile and flow pattern throughout the exchanger and/or that are integral with a reaction vessel are disclosed. Methods for using the exchangers including methods that involve use of the exchanger and a reaction vessel to produce a reaction product gas containing trichlorosilane are also disclosed.

10 Claims, 11 Drawing Sheets

Related U.S. Application Data

(60) Provisional application No. 61/439,199, filed on Feb. 3, 2011.

(56) References Cited

U.S. PATENT DOCUMENTS

| | | | |
|---|---|---|---|
| 4,127,389 A | 11/1978 | Hackemesser et al. | |
| 4,197,907 A | 4/1980 | Smith | |
| 4,198,379 A * | 4/1980 | James | B01D 53/8625 |
| | | | 423/239.1 |
| 4,203,906 A | 5/1980 | Takada et al. | |
| 4,217,334 A | 8/1980 | Weigert et al. | |
| 4,526,769 A | 7/1985 | Ingle et al. | |
| 4,536,642 A | 8/1985 | Hamster et al. | |
| 4,904,455 A | 2/1990 | Karafian et al. | |
| 5,126,112 A | 6/1992 | Burgie | |
| 5,250,270 A * | 10/1993 | Noe | B01J 8/0214 |
| | | | 422/148 |
| 5,323,849 A | 6/1994 | Korczynski, Jr. et al. | |
| 5,759,500 A | 6/1998 | Garner et al. | |
| 5,906,799 A | 5/1999 | Burgie et al. | |
| 2004/0123523 A1 | 7/2004 | Rong et al. | |
| 2005/0129593 A1 | 6/2005 | Hotta et al. | |
| 2005/0131254 A1 | 6/2005 | Yada et al. | |
| 2005/0194120 A1 | 9/2005 | Lomas, Jr. et al. | |
| 2007/0073075 A1 * | 3/2007 | Paetzold | C01B 33/1071 |
| | | | 556/466 |
| 2007/0187079 A1 | 8/2007 | Shin et al. | |
| 2008/0112875 A1 | 5/2008 | Garcia-Alonso et al. | |
| 2009/0269259 A1 | 10/2009 | Ishii et al. | |
| 2009/0285743 A1 | 11/2009 | Mizushima et al. | |
| 2010/0008842 A1 | 1/2010 | Pfluegler et al. | |

FOREIGN PATENT DOCUMENTS

| | | |
|---|---|---|
| DE | 102005049067 A1 | 4/2007 |
| EP | 1113238 A2 | 7/2001 |
| EP | 1491842 A2 | 12/2004 |
| JP | 62021707 A | 1/1987 |
| JP | 2000258087 A | 9/2000 |
| WO | 0017593 | 3/2000 |
| WO | 2004113814 A1 | 12/2004 |

OTHER PUBLICATIONS

Non-Final Office Action, U.S. Appl. No. 13/355,303, dated Apr. 25, 2014, pp. 12.

Non-Final Office Action; U.S. Appl. No. 13/355,303, dated Jan. 20, 2012, pp. 16.

International Search Report and Written Opinion of the International Searching Authority mailed on May 22, 2012 regarding PCT/IB2012/050432; 12 pgs.

* cited by examiner

METHODS FOR REACTING COMPOUNDS

CROSS-REFERENCE TO RELATED APPLICATIONS

This application is a divisional of U.S. patent application Ser. No. 13/355,309, filed Jan. 20, 2012, which claims the benefit of U.S. Provisional Patent Application No. 61/439,199, filed Feb. 3, 2011, both of which are incorporated herein by reference.

FIELD OF THE DISCLOSURE

The field of this disclosure relates to heat exchangers and, particularly, baffled shell and tube heat exchangers. The field of the disclosure also relates to methods for using the exchangers including methods that involve use of the exchanger and a reaction vessel to produce a reaction product gas.

BACKGROUND

Various process systems (e.g., reactor systems) involve use of relatively high temperature and/or relatively low temperature process streams. The cooling and/or heating of such streams may involve significant energy costs. To reduce such costs the process streams may be thermally contacted to exchange heat and reduce the energy costs. However, such thermal contact may be difficult or even prohibited when such process gases contain an amount of corrosive gases. The presence of corrosive gases has often conventionally required the process gas be quickly heated or cooled to a temperature at which the gases are less corrosive before heat exchange with other process gases may occur which increases the energy requirements of the system.

An example of such a system in which corrosive gases are produced thereby limiting heat exchange with other process gases is a reaction system in which silicon tetrachloride is reacted with hydrogen to produce trichlorosilane. This reaction produces hydrogen chloride as a by-product. As the equilibrium reaction toward trichlorosilane is favorable at high temperatures, the hydrogen chloride is typically at a high temperature which conventionally has required it to be quickly quenched. This conventionally has limited the amount of heat that can be transferred from the product gas to other process streams.

Accordingly a continuing need exists for reactor and heat exchange systems that allow process gases (e.g., gases containing a corrosive gas) to be heated or cooled relatively soon after production of the product gas. A continuing need also exists for heat exchangers that improve the temperature and flow profiles of the incoming process streams. A continuing need also exits for methods that involve use of such heat exchangers and/or reactor vessels.

SUMMARY

One aspect of the present disclosure is directed to a reactor apparatus for reacting one or more compounds in a reactor feed gas and exchanging heat between the reactor feed gas and a reactor product gas. The apparatus includes a reaction vessel and a shell and tube heat exchanger for transferring heat between the reactor feed gas and product gas. The reaction vessel has a wall and contains a reaction chamber in which the reaction occurs. The shell and tube heat exchanger contains a shell that is in fluid communication with the reaction chamber and a tube bundle within the shell. The tube bundle extends through the wall into the reaction vessel. The bundle includes a plurality of central tubes and a plurality of peripheral tubes between the central tubes and the shell. The tubes are in fluid communication with the reaction chamber.

Another aspect of the present disclosure is directed to a method for reacting one or more compounds in a reactor feed gas and exchanging heat between the reactor feed gas and a reactor product gas. The reaction and heat exchange occur in a reactor apparatus with a reaction vessel having a wall and a reaction chamber in which the reaction occurs. The apparatus also includes a shell and tube heat exchanger for transferring heat between the reactor feed gas and reactor product gas. The shell and tube heat exchanger contains a shell that is in fluid communication with the reaction chamber and a tube bundle within the shell and a chamber formed between the tube bundle and the shell. The tube bundle extends through the wall into the reaction vessel. The bundle has a plurality of central tubes and a plurality of peripheral tubes between the central tubes and the shell. The tubes are in fluid communication with the reaction chamber. The reactor feed gas is introduced into the peripheral tubes and central tubes of the shell and tube heat exchanger. The reactor feed gas is discharged into the reaction vessel to cause one or more compounds of the reactor feed gas to react and to form the reactor product gas. The reactor product gas is introduced into the chamber formed between the tube bundle and the shell. The reactor product gas is discharged from the shell.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
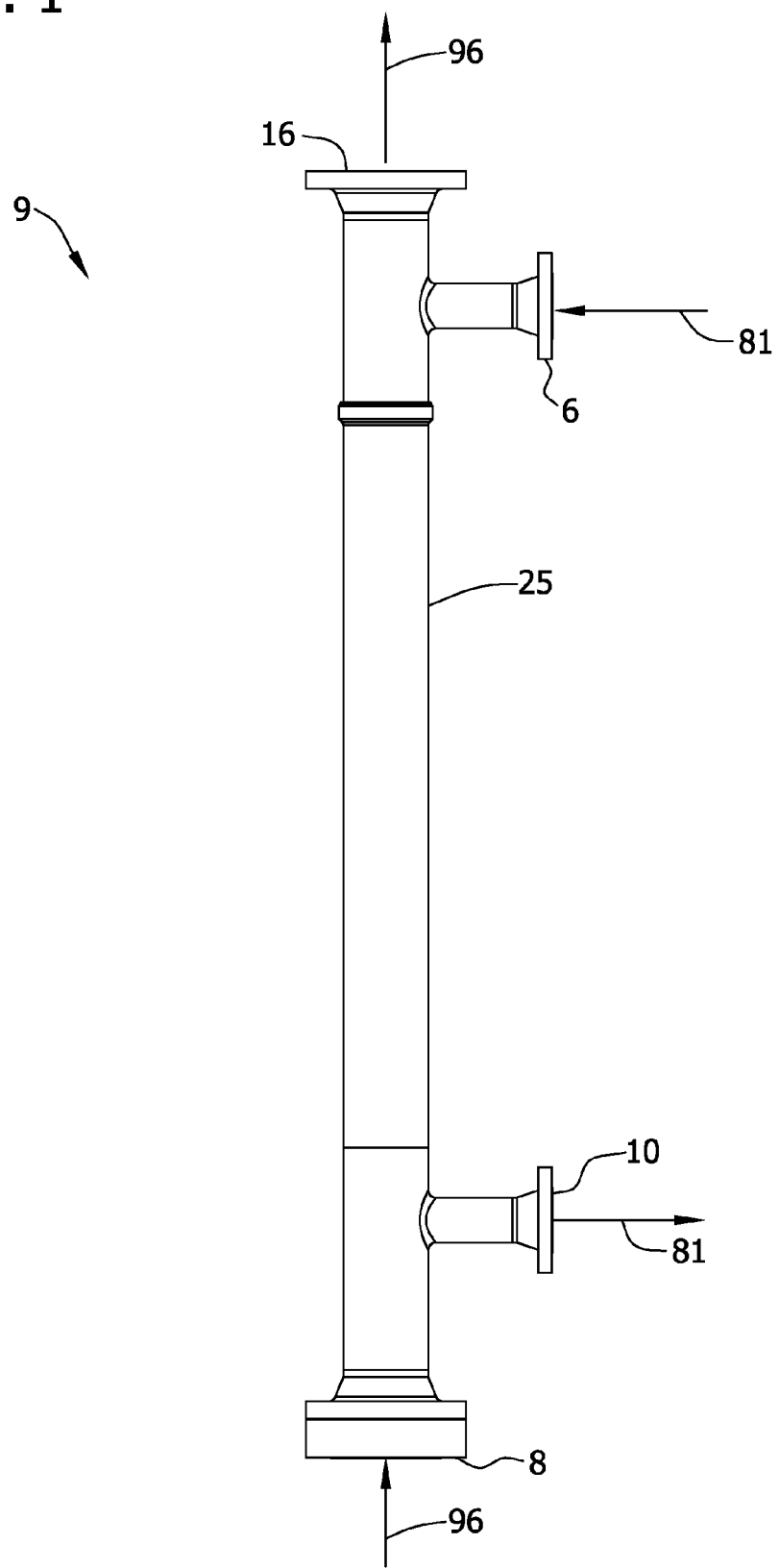
FIG. 1 is a front view of a shell and tube heat exchanger according to a first embodiment of the present disclosure.
Figure 3:
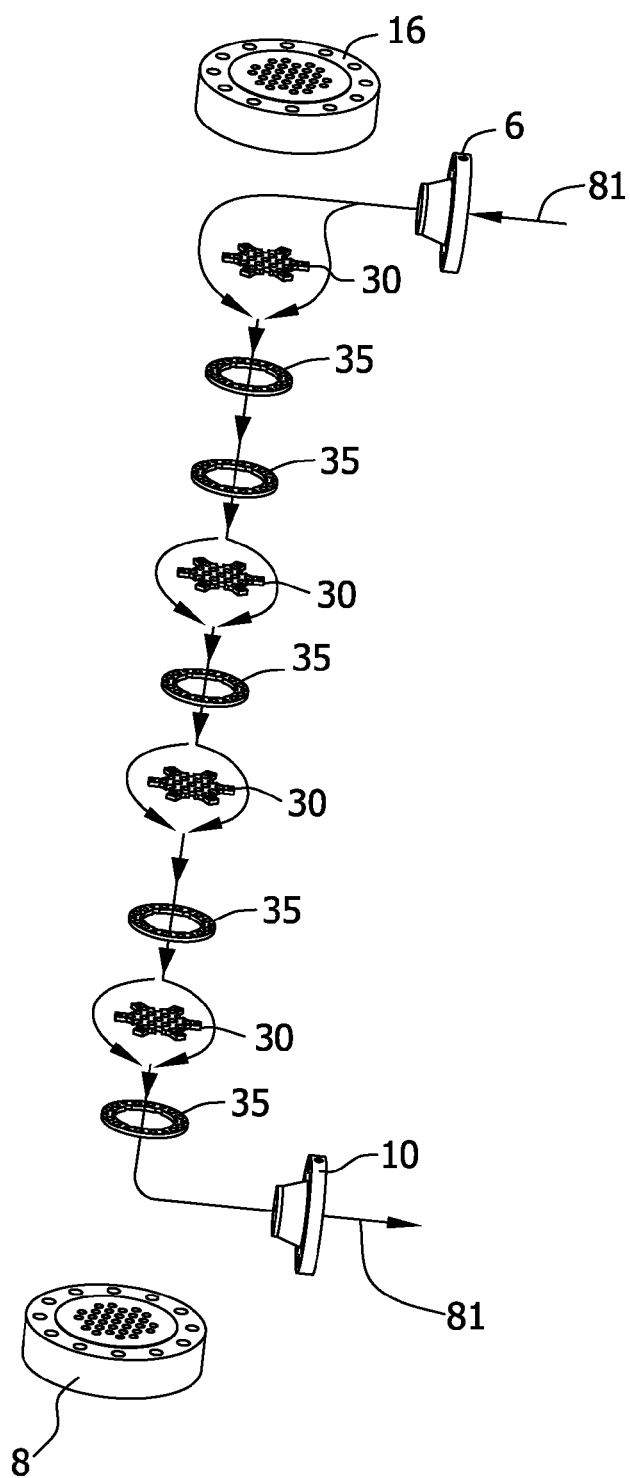
FIG. 3 is an exploded perspective view of portions of the heat exchanger and with the shell and tubes removed for clarity.

Referring now to FIG. 1, a shell and tube heat exchanger 9 for exchanging heat between two process streams in accordance with the present disclosure is shown. The shell and tube heat exchanger 9 incorporates two different types of baffles (i.e., central and annular baffles which are shown in FIG. 3) that are arranged in the exchanger in a manner which improves heat exchange and the resulting temperature profiles for a first fluid and a second fluid introduced into the exchanger.

Generally a first fluid (e.g., a first process gas) is introduced into the shell-side of the exchanger (i.e., the chamber formed between the tubes and the shell) and a second fluid (e.g., second process gas) is introduced into tube-side (i.e., into the tubes of the exchanger). The first fluid is forced into the central portion of the exchanger as it passes through the annular baffles and is forced into the peripheral portions of the exchanger as it passes around the central baffle. Generally the annular and central baffles alternate in the exchanger which causes the first process gas to be forced to the periphery of the exchanger and to the central portions of the exchanger in an alternating pattern and thereby improves heat transfer between the first and second process streams. As shown in FIG. 1, the first fluid generally enters the heat exchanger 9 at the top of the reactor at a shell-side inlet 6 and exits at the shell-side outlet 10 and the second fluid enters the heat exchanger 9 and the tubes at the bottom of the reactor at a tube-side inlet 8 and exits at the tube-side outlet 16. It should be understood that other arrangements may be used without limitation.

The shell and tube heat exchanger 9 may be made partially or wholly integral with a reactor apparatus (FIG. 9) which allows a reactor feed gas to enter the reactor after exchanging heat with a reactor product gas. As described herein, the reactor feed gas is introduced into the tubes of the reactor and exits into the reaction chamber wherein it reacts to form the product gas. The product gas is then introduced into the reactor shell-side (i.e., in the space formed between the tubes and the shell of the reactor) to exchange heat with the feed gas before exiting at the bottom of the exchanger. Other arrangements may be used without limitation.

Figure 9:
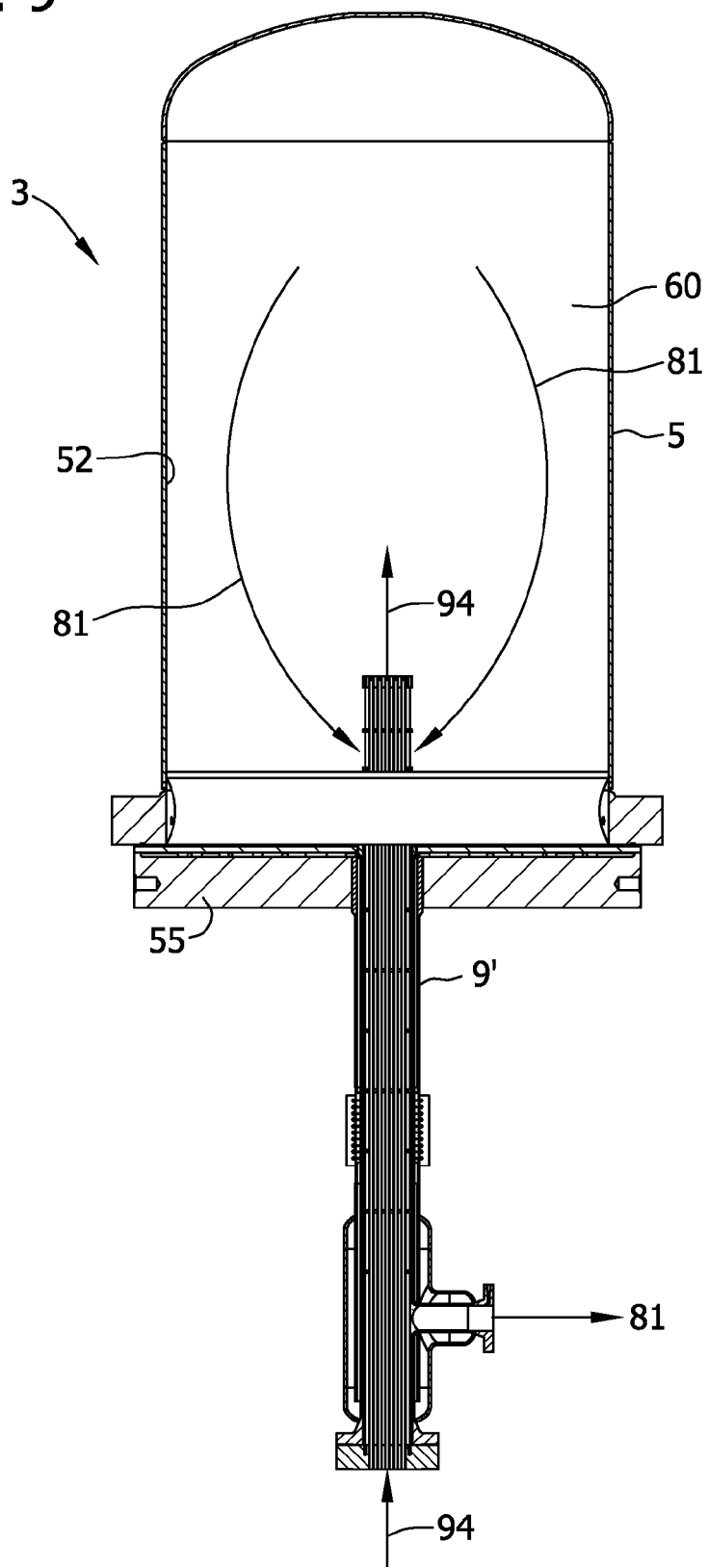
FIG. 9 is a cross-sectional view of a reactor apparatus that includes a reaction vessel and a shell and tube heat exchanger.

Optionally, the reactor apparatus of FIG. 9 may be used in a process to produce trichlorosilane from silicon tetrachloride. Silicon tetrachloride and hydrogen may be introduced tube-side into the heat exchanger 9'. Silicon tetrachloride and hydrogen continue upwards in the exchanger 9' until the gases exit the exchanger and enter the reaction chamber 5. Silicon tetrachloride and hydrogen are heated in the chamber 5 (e.g., by resistance heaters) to produce a reaction product gas comprising trichlorosilane and hydrogen chloride. This reaction product gas is forced out of the chamber 5 and enters the shell-side of the exchanger 9'. As the product gas travels shell-side through the exchanger 9' it heats the incoming feed gas. Optionally the exchanger 9' is water-jacketed to allow the shell-side reaction product gas to be quickly cooled which favors conversion to trichlorosilane (e.g., prevents the backwards reaction from occurring) and prevents corrosion of the reaction components (e.g., prevents formation of volatile metallic chlorides by quickly cooling below, for example, about 400° C.).

Shell and Tube Heat Exchanger

Referring again to FIG. 1, a shell and tube heat exchanger 9 for exchanging heat between two process streams is shown. The exchanger 9 includes a shell 25 and a tube bundle (not shown) disposed within the shell 25. The exchanger 9 includes a shell-side inlet 6 in which a first process gas 81 is introduced and a tube-side inlet 8 in which a second process gas 96 is introduced. The first process gas 81 flows within the chamber formed between the tubes of the tube bundle and the shell, including the space between the tubes themselves, and the second process gas 96 flows within the tubes of the tube bundle. The first gas and second gas 81, 96 generally flow in a countercurrent arrangement as they pass through the shell and tube heat exchanger 9; however, it should be understood that other flow patterns (con-current flows and/or multi-pass systems) may be used without limitation. After thermal contact in the exchanger 9, the first process gas 81 is discharged in the shell-side outlet 10 and the second process gas 96 is discharged from the tube side outlet 16. In this regard, it should be understood that other inlet and outlet arrangements may be used including, for example, the inlet and outlet arrangement of exchanger 9' (FIG. 9) described below.

Figure 2:
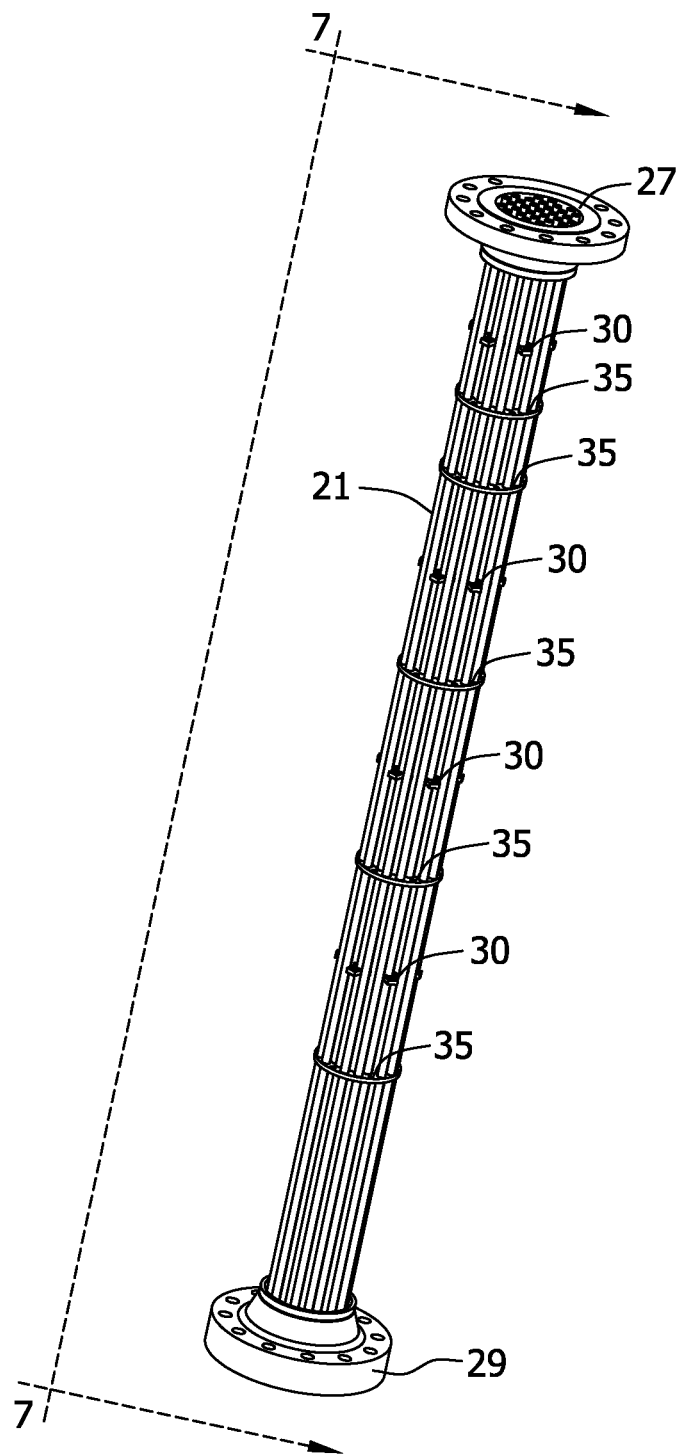
FIG. 2 is a perspective view of the heat exchanger with the shell removed for clarity.
Figure 6:
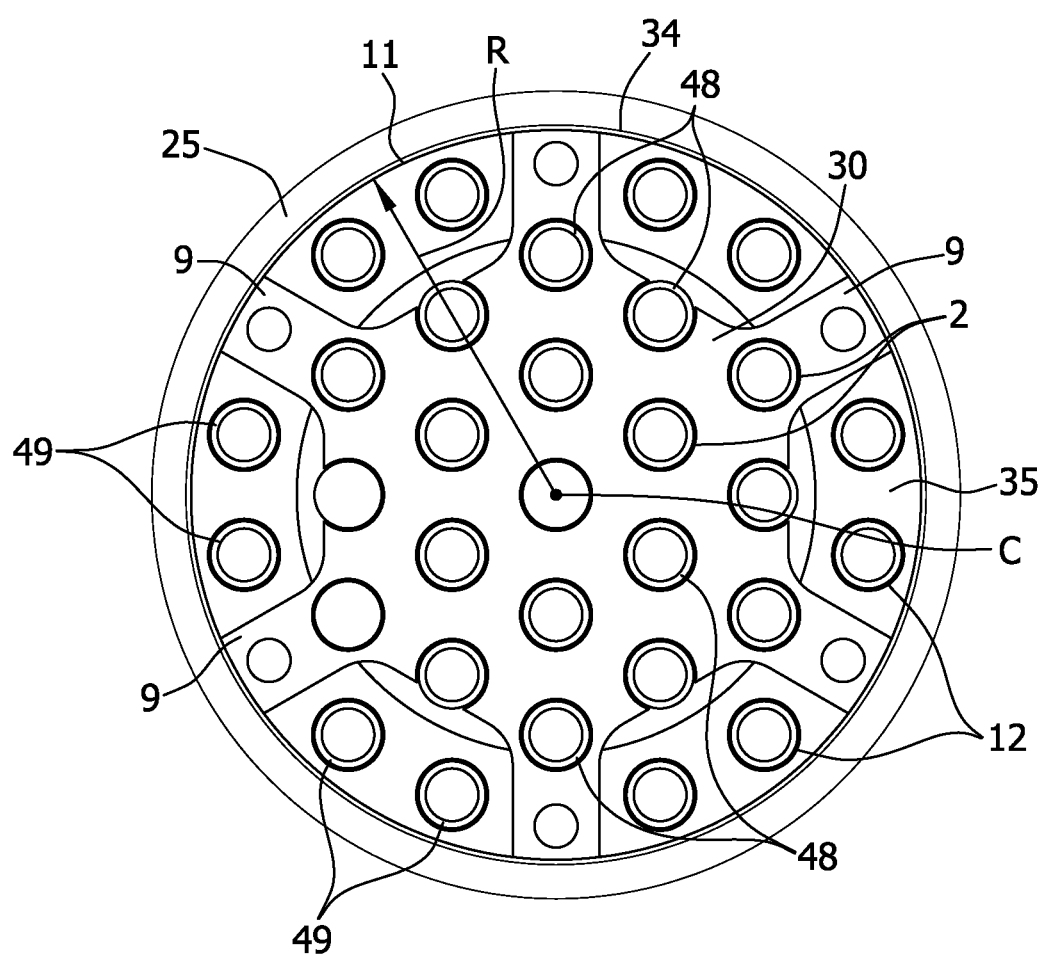
FIG. 6 is a top view of the heat exchanger with the tube side outlet and second terminal flange removed for clarity.

Referring now to FIG. 2 (in which the shell is not shown for clarity) and FIG. 6, the tube bundle 21 includes a number of tubes generally arranged in concentric circles about center C. The tubes generally extend from a first terminal flange 29 to a second terminal flange 27. A number of baffles 30, 35 help secure the tubes within the bundle 21 and influence the flow of the first process gas within the exchanger and the resulting first and second gas temperature profiles. FIG. 3 shows the arrangement of the baffles 30, 35 with the tube bundle 21 not shown for clarity and with the shell-side inlet 6 and outlet 10 and tube-side inlet 8 and outlet 16 shown to illustrate the relative position of the baffles 30, 35. The exchanger 9 includes a plurality of central baffles 30 that secure a number of central tubes (not shown) and a plurality of annular baffles 35 that secure a number of peripheral tubes (not shown). As shown in FIG. 3, the central baffles 30 and annular baffles 35 alternate in their relative positions in the exchanger; however, it should be understood that other arrangements of central baffles 30 and annular baffles 35 may be used without limitation. The flow pattern of the first process gas 81 is shown in FIG. 3. As can be seen from the flow pattern, the first process gas 81 is forced to the outside of the central baffles 30 and inward through the annular baffles 35 thereby creating a cross-flow which promotes heat exchange between the first and second process gases.

Figure 4:
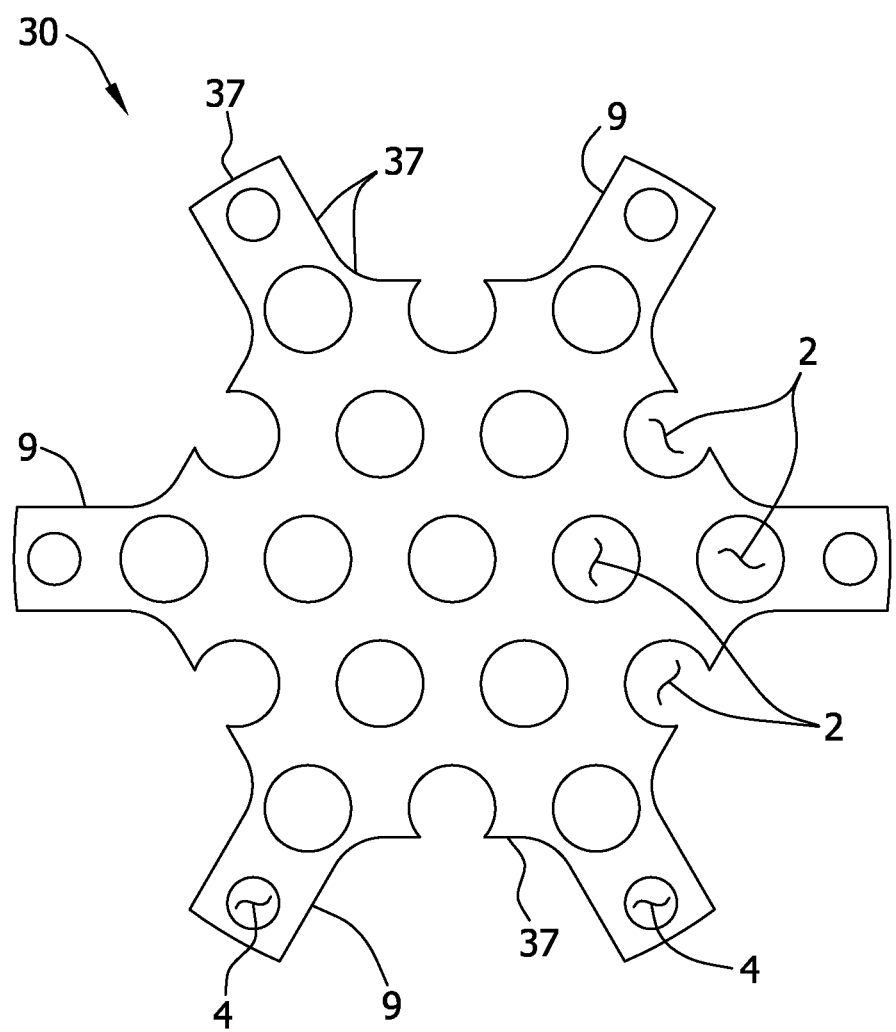
FIG. 4 is a top view of a central baffle.

A central baffle 30 is shown in FIG. 4. The central baffle 30 includes a plurality of central openings 2 through which the central tubes pass. The central baffle has an outer edge 37. The peripheral tubes (not shown) pass between the outer edge 37 of the central baffle 30 and the shell 25 (FIG. 1). The central baffle 30 includes a number of flare-out portions 9 in which a tie-rod opening 4 is formed. Tie-rods (not shown) pass through the tie-rod openings 4 and provide stability to the baffles 30, 35. Tie-rods may be attached to the baffles 30, 35 in any suitable manner including, for example, by use of spacers (not shown).

Figure 5:
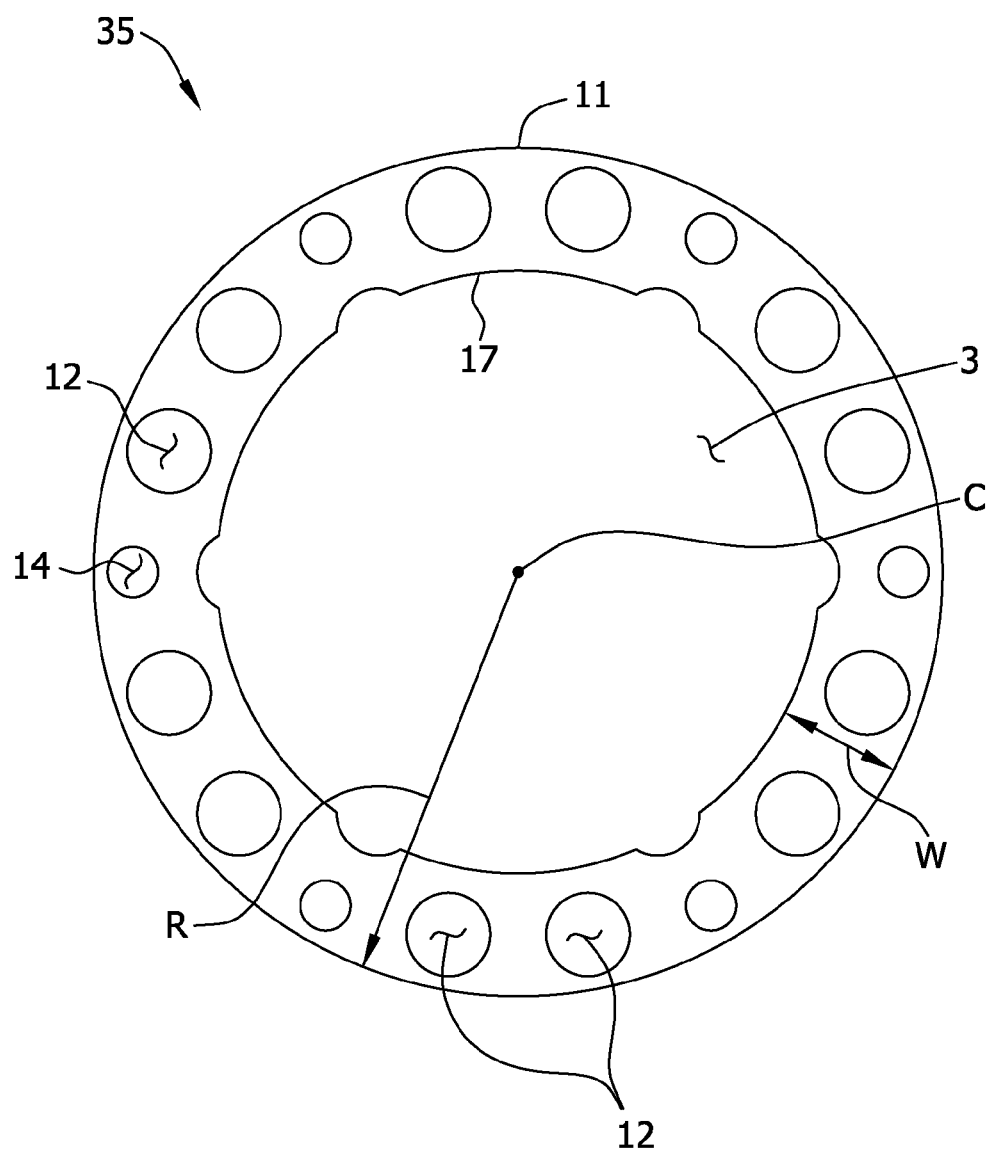
FIG. 5 is a top view of an annular baffle.

An annular baffle 35 is shown in FIG. 5. The annular baffle 35 has a center C, an annular outer edge 11, an annular inner edge 17 and a plurality of peripheral openings 12 formed within the annular outer edge 11 and the annular inner edge 17. A central opening 3 extends from the inner edge 17 to the center C of the annular baffle 35. The peripheral tubes (not shown) pass through the peripheral openings 12 and the central tubes (not shown) pass through the central opening 3. The annular baffle 35 includes tie-rod openings 14 through which tie-rods pass to stabilize the baffle 35.

FIG. 6 shows a top view of the exchanger 9 with a central baffle 30 shown and an annular baffle 35 partially shown. As can be seen from FIG. 6, central tubes 48 pass through the central openings 2 and peripheral tubes 49 pass through the peripheral openings 12. The radius R of the inner wall 34 of the shell 25 is substantially the same as the radius of the annular outer edge 11 of the annular baffle 35 and the annular baffle 35 generally contacts the shell 25. Similarly, the flare-out portions 9 of the central baffle 30 contact the inner wall 34 of the shell.

The annular baffle 35 (FIG. 5) should have a width W sufficient to force the first process gas toward the center of the heat exchanger. In one or more embodiments of the present disclosure, the ratio of the width of the annular baffle 35 to the radius R of the annular outer edge 11 (W:R) should be at least about 1:5, at least about 1:3 or at least about 1:2 (e.g., from about 1:5 to about 4:1 or from about 1:5 to about 1:1). In these and in other embodiments, the annular baffle 35 may define a cross-sectional area over its width which blocks the path of the first process gas. The ratio of the cross-sectional area defined by the annular baffle 35 (which may be $pi*R^2-pi*(R-W)^2$ for annular baffles) to the cross-sectional area of the shell of the exchanger (which may be $pi*R^2$ for cylindrical shell and tube exchangers) may be at least about 1:10, at least about 1:5 or at least about 1:3 (e.g., from about 1:10 to about 3:1 or from about 1:5 to about 1:1).

In this regard, the central baffle 30 (FIG. 4) may be suitably sized to force the first process gas to the periphery of the shell and tube exchanger. In one or more embodiments, the cross-sectional area defined by the central baffle approaches or may exceed the cross-sectional area of the central opening 3 (FIG. 5) of the annular baffle 35. In one or more embodiments, the ratio of cross-sectional area of the central baffle (FIG. 4) to the cross-sectional area of the central opening 3 of the annular baffle (which may be about $pi*(R-W)^2$) is at least about 1:5, at least about 1:3 or even at least about 2:3 (e.g., from about 1:5 to about 3:1 or from about 1:3 to about 1:1). The thickness of the annular baffle 35 and the central baffle 30 should be sufficient to provide structural integrity to the baffles as the first gas passes through the exchanger. The edges of the baffles 30, 35 may be beveled to reduce pressure drop across the baffles.

Generally, the exchanger 9 includes a plurality of annular baffles 35 and/or a plurality of central baffles 30. For example, the exchanger 9 may include at least about two annular baffles, or at least about three, at least about four, at least about five or even about six or more annular baffles. Similarly, the exchanger 9 may include at least about two central baffles, at least about three, at least about four, at least about five or about six or more central baffles. The total amount of annular baffles and central baffles may be at least about three, at least about five, at least about seven or even about ten or more.

Figure 11:
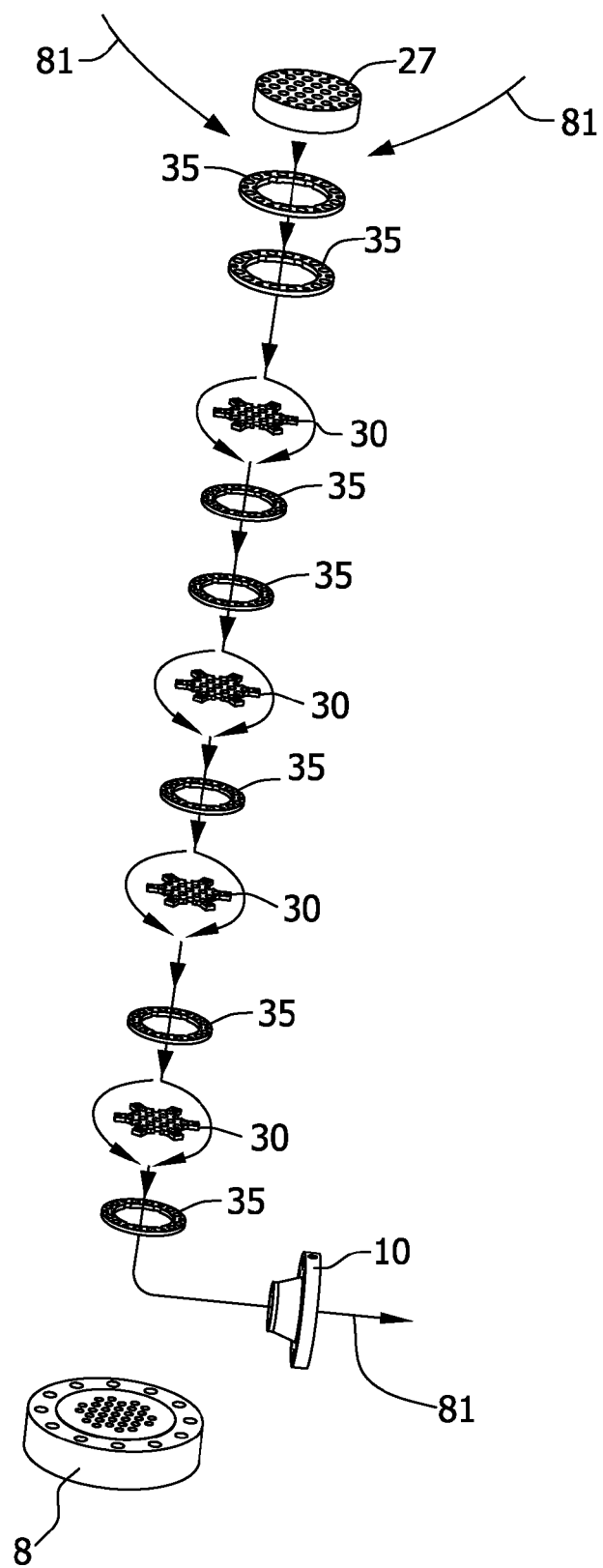
FIG. 11 is a perspective view of the apparatus of FIG. 9 with the vessel, shell and tubes removed for clarity.

As shown in FIGS. 3 and 11, generally the annular baffles 35 and central baffles 30 alternate to allow the first process gas to alternately flow to the center of the tube bundle to the peripheral region of the tube bundle. In some embodiments, no more than two annular baffles are adjacent to one another (i.e., are positioned in the tube bundle such that no central baffle is positioned between them) or even no annular baffles are adjacent to one another. Additionally or alternatively, in some embodiments no more than two central baffles are adjacent to one another or even no central baffle is adjacent to another central baffle.

It has been found that the heat transfer dynamics of the heat exchanger and, in particular, heat exchangers used within a reaction system for producing trichlorosilane from silicon tetrachloride, may be improved by limiting the average distance $D_1$ between baffles 30, 35. Accordingly and in several embodiments of the present disclosure, the ratio of the average axial distance between baffles $D_1$ and the diameter $D_2$ of the inner wall 34 of the shell and/or baffles (i.e., 2*R as shown in FIGS. 5 and 6) is from about 3:1 to about 1:3, from about 2:1 to about 1:2 or from about 2:1 to about 1:1. In this regard, the average axial distance $D_1$ between baffles may be determined by dividing the length L of the tube bundle by the number N of baffles used to support the tube bundle.

Figure 7:
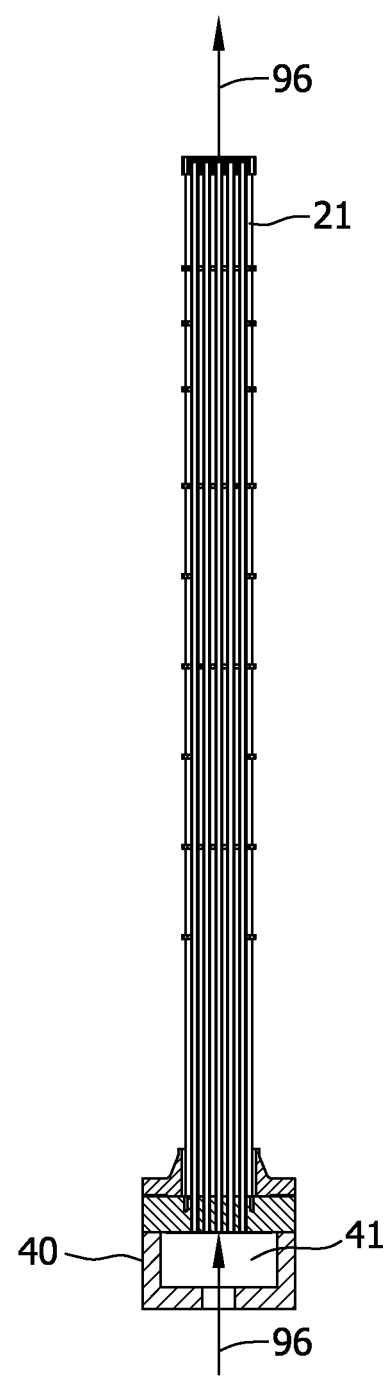
FIG. 7 is a cross-sectional view of the heat exchanger taken along the 7-7 line of FIG. 2 with the distribution plate being shown.

Referring now to FIG. 7, the exchanger includes a distribution plate 40 with a plenum 41 formed therein to distribute the second gas 96 into the exchanger. The plenum 41 is in fluid communication with the peripheral tubes and the central tubes to introduce a fluid into the peripheral tubes and central tubes.

Figure 8:
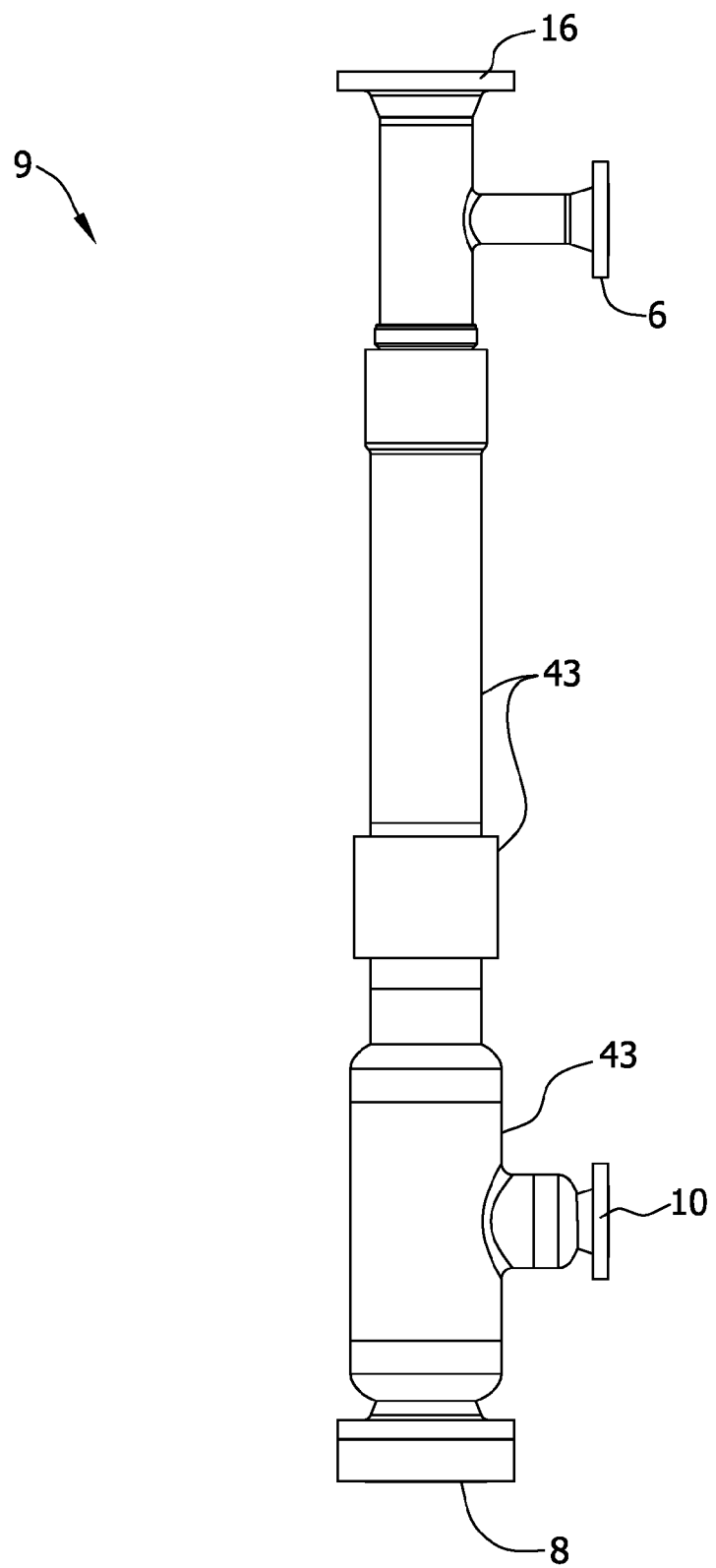
FIG. 8 is a front view of the heat exchanger showing a second shell used to circulate an additional heating or cooling fluid within the heat exchanger.

In some embodiments and as shown in FIG. 8, the heat exchanger 9 includes a second shell 43 that is concentric to the first shell (not shown) and has a radius greater than the radius of the first shell to form an annular chamber between the first shell and second shell. A fluid (e.g., water) may be introduced and withdrawn into and from the annular chamber to heat or cool the shell-side gas. The fluid may be introduced into and withdrawn from the jacket at any number of positions.

In this regard, it should be understood that while the shell and tube heat exchanger 9 and various corresponding parts are generally shown as being cylindrical, other arrangements may be used and the cylindrical arrangement should not be considered in a limiting manner. Further, it should be understood that while the shell-side and tube-side fluids have been generally described herein as being gases, the fluids may also be liquids without limitation. In addition, the shell side fluid may transfer heat to the tube-side fluid or the tube-side fluid may transfer heat to the shell-side fluid without limitation.

Reaction Apparatus Including Integrated Shell and Tube Heat Exchanger and Reaction Chamber The shell and tube heat exchanger 9 described above may be incorporated into a reactor apparatus for reacting one or more compounds in a reactor feed gas and exchanging heat between the reactor feed gas and a reactor product gas. Referring now to FIG. 9, the reactor apparatus 3 for reacting one or more compounds in a reactor feed gas and exchanging heat between the reactor feed gas and a reactor product gas is shown. The apparatus 3 includes a shell and tube heat exchanger 9' to which a reactor feed gas 94 is introduced and a reaction vessel 5 in which the majority of the relevant reactions occur. The reactor product gas 81 formed in the reaction vessel 5 is introduced into the exchanger 9' thereby allowing the product gas 81 and feed gas 94 to thermally communicate and exchange heat as more fully described below.

Figure 10:
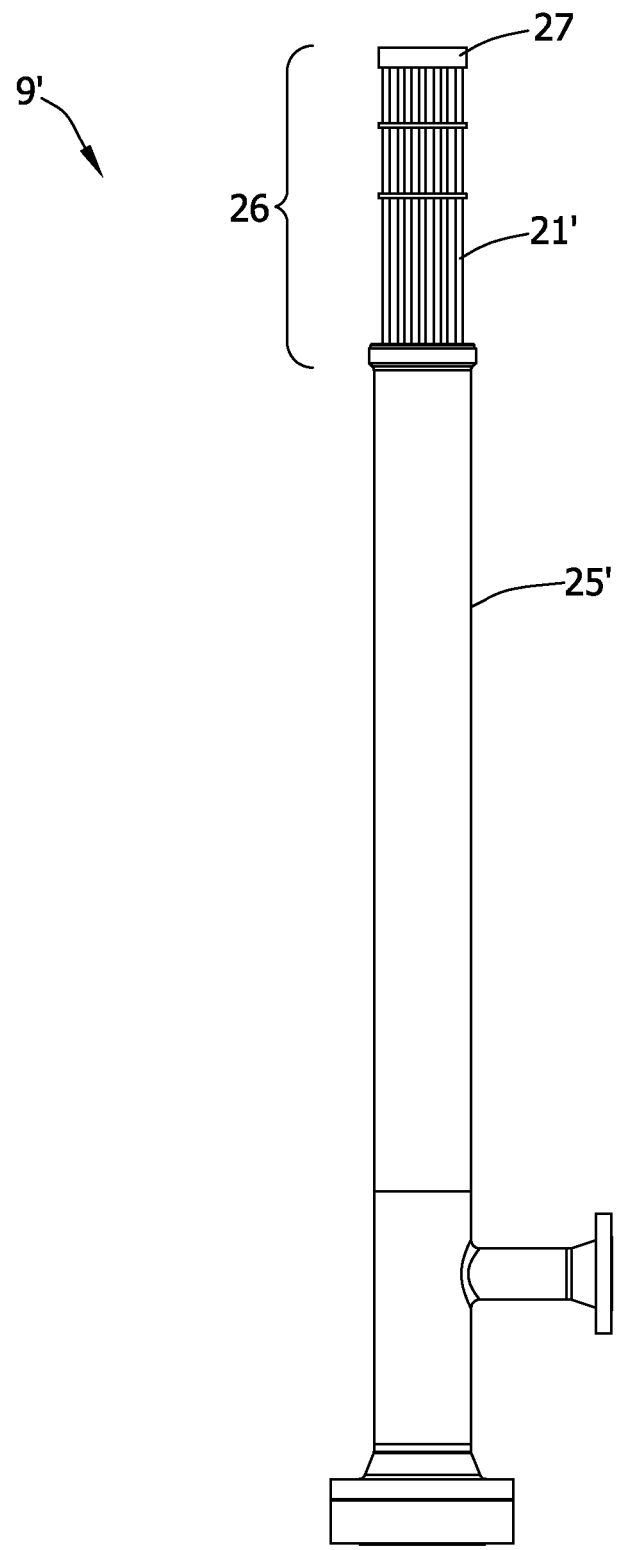
FIG. 10 is a front view of the reactor apparatus of FIG. 9 with the vessel removed for clarity.

Referring now to FIG. 10 in which the second shell and reaction vessel are not shown for clarity, the exchanger 9' includes a shell 25' and a tube bundle 21' partially disposed within the shell 25'. Unlike the shell and tube heat exchanger 9 shown in FIGS. 1-8, the tube bundle 21' includes an upper portion 26 which extends from the shell 25' into the reaction vessel 5 (FIG. 9) and a lower portion 22 (not shown) which is disposed within the shell 25'. Unlike the shell and tube exchanger 9 shown in FIGS. 1-8, the shell-side inlet and tube-side outlet of the exchanger 9' are positioned within the reaction vessel 5. The shell and tube exchanger 9' includes a terminal flange 27 in which the tubes are secured at their upper end.

The arrangement of the baffles 30, 35 in the exchanger 9' is shown in FIG. 11. The arrangement generally corresponds to the arrangement described above in regard to exchanger 9 (including the ratios of the average distance between baffles and baffle diameter) and as shown in FIG. 3; however the exchanger 9' includes two additional annular baffles 35 that provide support to the upper portion 26 (FIG. 10) of the tube bundle 21'. These two additional baffles 35 are optional and in some embodiments, the exchanger 9' only includes one additional baffle 35 that supports the upper portion 26 (FIG. 10) of the tube bundle 21' or, as in other embodiments, no additional baffles are used. As can be seen from FIG. 11 and according to some embodiments of the present disclosure, no more than two annular baffles are adjacent to one another and no central baffle is adjacent to another central baffle. The flow pattern of the product gas 81 is shown in FIG. 11 for clarity. In this regard, the product gas 81 may enter the reactor by entering the space formed within any part of the portion 26 (FIG. 10) of the tube bundle 21' that extends into the reaction vessel 5 (FIG. 9). In some embodiments, a shell (not shown) partially covers the portion 26 (FIG. 10) of the tube bundle 21' that extends into the reaction vessel such that the product gas enters the exchanger 9' above the shell (e.g., the shell may cover the two top-most peripheral baffles 35 and the product gas enters between the terminal flange 27 and top-most peripheral baffle 35). Note that other baffle arrangements are contemplated within the scope of this disclosure.

Referring again to FIG. 9, the walls of the reaction vessel 5 include a capped cylindrical wall 52 and a base plate 55 that define a reaction chamber 60 in which the relevant reactions occur. The vessel 5 may include a number of heating elements (e.g., resistance heaters) in the chamber 60 to heat the incoming gases and may also include one or more heat shields within the vessel to prevent escape of corrosive gases and to insulate the vessel 5. In some embodiments, the reactor vessel 5 includes an inner heat shield and an outer heat shield. The inner heat shield may prevent escape of gases (e.g., hydrogen, silicon tetrachloride) and may be constructed of, for example, extruded graphite, isostatic graphite, silicon carbide, quartz and silicon nitride. The outer shield may be used to prevent heat from being lost from the reactor apparatus 3 and may be composed of, for example, carbon fibers, soft felt, rigid felt, carbon composite materials, natural graphite sheets and quartz. The materials of construction for the reaction vessel 5 and heat exchanger 9' (and also exchanger 9 shown in FIGS. 1-8) may be selected to be resistant to corrosion in an environment that includes exposure to the various fluids transferred and/or reacted therein. Suitable materials of construction are conventional and well-known in the field of the disclosure and include, for example, silicon carbide, stainless steel, INCONEL alloys and HASTELLOY alloys. In some embodiments, the tube bundle 21 is constructed of a silicon carbide (e.g., a sintered silicon carbide).

The reactor apparatus 3 may be operated in accordance with any of the known methods for reacting the various reactants and product gases chosen for use. Generally the reactor feed gas (or feed gases in embodiments wherein two or more different reactor feed gases are used) are introduced into the peripheral tubes and/or central tubes of the shell and tube heat exchanger 9'. The reactor feed gas is discharged into the reaction vessel to cause one or more compounds of the reactor feed gas to react and to form the reactor product gas. After reaction, the reactor product gas is introduced back into the exchanger 9' into the chamber formed between the tube bundle and the shell.

In this regard, it is generally advantageous to discharge the reactor gases into the chamber 60 at a point above where the product gas is fed back into the exchanger 9' as shown in FIG. 9 to prevent reactor gases from being fed back into the exchanger 9' and being discharged from the reactor apparatus 3 before reaction may occur. The peripheral and central tubes may terminate in a nozzle (i.e., any discharge opening smaller than the tubes themselves) to provide motive force and allow the gases to reach the upper portions of the chamber before being drawn back to the point at which the product gas is drawn back into the exchanger 9'. In this regard, it should be understood that the reactor feed gas may partially react in the tubes themselves during heating or cooling of the reaction gas.

Production of Trichlorosilane from Silicon Tetrachloride

In one or more particular embodiments of the present disclosure, the reactor apparatus 3 is used to produce trichlorosilane from silicon tetrachloride and hydrogen. Silicon tetrachloride generally reacts with hydrogen to produce trichlorosilane according to the following reaction,

$$SiCl_4 + H_2 \rightarrow SiHCl_3 + HCl \qquad (1).$$

A small amount of trichlorosilane can further react with hydrogen to form dichlorosilane according to the following reaction:

$$SiHCl_3 + H_2 \rightarrow SiH_2Cl_2 + HCl \qquad (2).$$

Silicon tetrachloride and hydrogen may be included in the reactor feed gas that is introduced into the tubes of the shell and tube exchanger 9'. The silicon tetrachloride and hydrogen are further heated in the reaction vessel (e.g., by use of resistive elements) to form a product gas comprising trichlorosilane, hydrogen chloride, unreacted silicon tetrachloride and hydrogen. The resulting product gas is introduced into the exchanger 9' to heat the incoming reaction feed gas. As described above in regard to FIG. 8, the exchanger 9' includes a second shell 43 that forms an annular chamber between the first shell and second shell in which a cooling fluid may be circulated. This allows the shell-side product gases to be rapidly quenched to reduce the corrosiveness thereof before down stream processing (e.g., purification, polycrystalline production) and to increase reaction conversion (i.e., to prevent trichlorosilane from reverting back to silicon tetrachloride or other compounds).

Further in this regard, any vessel 5 suitable for the hydrogenation reaction as appreciated by those of skill in the art may be used without limitation. The vessel 5 may include a number of heating elements to heat the incoming gases to a temperature which favors conversion to trichlorosilane. The contents of the reaction vessel 5 may be heated to a temperature of at least about 800° C. to convert silicon tetrachloride to trichlorosilane. In some embodiments, silicon tetrachloride and hydrogen are heated to a temperature of at least about 900° C., at least about 1000° C. or even at least about 1100° C. (e.g., from about 800° C. to about 1200° C. or from about 1000° C. to about 1200° C.). The reaction vessel 5 may also be pressurized to promote formation of trichlorosilane. For instance, the reaction vessel 5 may be operated at a pressure of at least about 2 bar and, in other embodiments, at least about 5 bar, at least about 10 bar or even at least about 15 bar (e.g., from about 2 bar to about 20 bar or from about 8 bar to about 15 bar). The ratio of hydrogen to silicon tetrachloride introduced into the reaction apparatus 3 may vary depending on the reaction conditions. Use of a stoichiometric excess of hydrogen typically results in increased conversion to trichlorosilane. In various embodiments, the molar ratio of hydrogen to silicon tetrachloride is at least about 1:1, at least about 2:1 or even at least about 3:1 (e.g., from about 1:1 to about 5:1 or from about 1:1 to about 3:1). In this regard, it should be understood that typically silicon tetrachloride and hydrogen are in the same feed gas, however, in certain embodiments, silicon tetrachloride and hydrogen may be introduced into the reaction apparatus such that the gases travel in separate tubes and do not mix until entry into the reaction chamber 5.

Generally, at least about 20% of silicon tetrachloride is converted to trichlorosilane in the reactor with conversions of at least about 30% or even at least about 40% being possible (e.g., from about 20% to about 40% conversion). The resulting hydrogenated gas contains trichlorosilane, a small amount of by-product dichlorosilane, unreacted silicon tetrachloride, unreacted hydrogen and hydrogen chloride. Depending on the amount of excess hydrogen added to the reaction apparatus 3, the amount of trichlorosilane in the product gas may be at least about 5 vol % and, in other embodiments, at least about 15 vol %, or at least about 25 vol %, (e.g., from about 5 vol % to about 40 vol %, from about 5 vol % to about 20 vol % or from about 5 vol % to about 10 vol %). Likewise, the amount of hydrogen chloride in the hydrogenated gas may be at least about 5 vol % and, in other embodiments, at least about 15 vol %, or at least about 25 vol %, (e.g., from about 5 vol % to about 40 vol %, from about 5 vol % to about 20 vol % or from about 5 vol % to about 10 vol %). The amount of unreacted silicon tetrachloride may be at least about 10 vol %, at least about 20 vol %, at least about 30 vol % or at least about 40 vol % of the product gas stream (e.g., from about 10 vol % to about 40 vol %, from about 10 vol % to about 30 vol % or from about 15 vol % to about 25 vol %). The amount of by-product dichlorosilane may be at least about 0.2 vol %, at least about 0.4 vol %, at least about 0.8 vol % or at least about 1.0 vol %. The remainder of the product gas is typically hydrogen. For instance, the reactor product gas may include at least about 40 vol % hydrogen or, as in other embodiments, at least about 50 vol %, at least about 60 vol %, at least about 70 vol % or even at least about 80 vol % hydrogen (e.g., from about 40 vol % to about 90 vol %, from about 50 vol % to about 80 vol % or from about 60 vol % to about 80 vol %).

In this regard it has been found that a reactor apparatus 3 that includes an exchanger 9' with a baffle arrangement as shown in FIG. 11 may produce favorable shell-side and tube-side temperature profiles in the production of trichlorosilane. Specifically it has been found that the tube-side reactor feed gases may be heated to at least about 600° C., at least about 650° C. or even at least about 700° C. (e.g., from about 600° C. to about 850° C., from about 600° C. to about 800° C.) prior to introduction into the reactor. Further, the shell-side product gas is rapidly cooled which is kinetically advantageous and which helps prevent corrosive hotspots in the exchanger 9' (e.g., at the point at which the shell 25 is attached to the reaction vessel 5). The trichlorosilane-containing reactor product gas may be cooled to less than about 550° C. or even less than about 450° C. before exiting the shell and tube heat exchanger 9'.

The methods described above relating to production of trichlorosilane from silicon tetrachloride may be incorporated into a larger system for producing polycrystalline silicon. For example, trichlorosilane from the reactor product gas may be introduced into a second reaction vessel to produce polycrystalline silicon. The second reaction vessel may be a fluidized bed in which trichlorosilane is contacted with fluidized silicon particles to deposit silicon on the particles to allow the particles to continuously grow in size until they exit the reactor as polycrystalline silicon product (i.e., "granular" polycrystalline silicon) or may be a Siemens-type reactor in which silicon deposits on heated silicon rods.

The reactor product gas may be introduced into a purification system (e.g., one or more distillation columns) to produce a purified trichlorosilane stream prior to introduction into the second reaction vessel to produce polycrystalline silicon (i.e., hydrogen chloride and/or silicon tetrachloride may be removed from the reactor product gas). Additionally, the separation system may separate unreacted silicon tetrachloride for recycle of silicon tetrachloride to the reactor apparatus 3. The reactor product stream may be purified to contain less than about 10 vol % of compounds other than trichlorosilane (e.g., silicon tetrachloride) and may contain even less impurities, such as less than about 5 vol %, less than about 1 vol %, less than about 0.1 vol % or even less than about 0.001 vol % of compounds other than trichlorosilane.

The purified reactor product gas is introduced into the fluidized bed reactor (or Siemens reactor in embodiments wherein Siemens-type reactors are used) in which it fluidizes growing silicon seed particles to produce polycrystalline silicon which may be withdrawn from the reactor as polycrystalline silicon product. Polycrystalline silicon is produced from trichlorosilane with formation of silicon tetrachloride by-product according to the following reactions,

$$SiHCl_3 + H_2 \rightarrow Si + 3HCl \quad (3),$$

$$SiHCl_3 + HCl \rightarrow SiCl_4 + H_2 \quad (4).$$

In addition to trichlorosilane, hydrogen is introduced into the fluidized bed reactor as a carrier gas and to improve the overall conversion to polycrystalline silicon. The fluidized bed reactor may be operated in accordance with U.S. application Ser. No. 12/910,465, filed Oct. 22, 2010, entitled "Production of Polycrystalline Silicon by the Thermal Decomposition of Trichlorosilane in a Fluidized Bed Reactor," which is incorporated herein by reference for all relevant and consistent purposes. For instance, trichlorosilane may be directed to the core region of the reactor and the overall concentration of trichlorosilane introduced into the reactor may be at least about 20% by volume (e.g., from about 20% to about 50% by volume). Incoming feed gases may be at a temperature of less than about 350° C. The reactor may be operated at less than about 90% equilibrium and with a residence time of less than about 10 seconds. The reactor may be operated at a pressure of from about 3 bar to about 8 bar and the reaction gases may be heated to a temperature of at least about 700° C. (e.g., from about 700° C. to about 1300° C.). The gas velocity through the fluidized bed reactor may be generally maintained at a velocity of from about 1 to about 8 times the minimum fluidization velocity necessary to fluidize the particles within the fluidized bed. The mean diameter of the particulate polycrystalline silicon that is withdrawn from the reactor may be from about 800 μm to about 1200 μm. Quench gases may be introduced into the reactor (e.g., at a freeboard region of the reactor) to reduce the temperature of the effluent gas before being discharged from the reactor to suppress formation of silicon dust. The fluidized bed reactor may include an outer shell in which an inert gas is maintained at a pressure above the pressure of the process gases (e.g., a pressure within the range of about 0.005 bar to about 0.2 bar) to ensure process gases do not flow through cracks and holes within the reaction chamber.

In some embodiments of the present disclosure, the conversion of trichlorosilane in the fluidized bed reactor may be at least about 40%, at least about 55%, at least about 70% or even at least about 80% (e.g., from about 40% to about 90% or from about 55% to about 90%). The selectivity toward deposited silicon may be at least about 10%, at least about 15%, at least about 20%, at least about 25% or even at least about 30% (e.g., from about 15% to about 40% or from about 20% to about 30%).

The effluent gas that exits the fluidized bed reactor includes silicon tetrachloride, unreacted trichlorosilane and hydrogen. The effluent gas may also contain minor amounts of other gases (e.g., hydrogen chloride) and silicon dust. In some embodiments of the present disclosure, the effluent gas may contain at least about 10 vol % silicon tetrachloride, at least about 15 vol %, at least about 20 vol % or at least about 30 vol % silicon tetrachloride (e.g., from about 10 vol % to about 40 vol % or from about 10 vol % to about 20 vol % silicon tetrachloride). The effluent gas may include at least about 10 vol % unreacted trichlorosilane, at least about 15 vol %, at least about 20 vol % or at least about 30 vol % unreacted trichlorosilane (e.g., from about 10 vol % to about 40 vol % or from about 10 vol % to about 20 vol % unreacted trichlorosilane). The bulk of the remainder of the effluent gas is typically hydrogen. For instance, the effluent gas that exits the fluidized bed reactor may include at least about 40 vol % hydrogen, at least about 50 vol %, at least about 60 vol %, at least about 70 vol %, at least about 80 vol % or even at least about 90 vol % hydrogen (e.g., from about 40 vol % to about 90 vol % or from about 60 vol % to about 80 vol %). The amount of hydrogen chloride in the effluent gas may be less than about 5 vol % and is typically less than about 1 vol % (e.g., from about 0.1 vol % to about 5 vol %). The amount of silicon dust in the effluent gas may be from about 0.1 wt % to about 5 wt %. In this regard, it should be understood that the above-referenced percentage inclusion for the recited components are exemplary and other relative amounts of components may be used without departing from the scope of the present disclosure.

In embodiments wherein fluidized bed reactors are used, the effluent gas produced from the fluidized bed reactor may pass through a particulate separator to remove silicon dust produced as a by-product of the thermal decomposition of trichlorosilane. Suitable particulate separators include, for example, sintered metal filters, bag filters, cyclonic separators and liquid scrubbers. The separated silicon tetrachloride by-product and/or trichlorosilane may be recycled to the first reactor apparatus 3 (FIG. 9) after optional purification steps (e.g., after removal of hydrogen chloride and/or silicon tetrachloride) by introducing the silicon tetrachloride by-product into the peripheral and central tubes of the shell and tube heat exchanger.

In this regard, it should be understood that the reactor apparatus described above may be used in a substantially closed loop system for producing polycrystalline silicon such as the processes and systems described in U.S. patent application Ser. No. 12/910,553, filed Oct. 22, 2010, entitled "Production of Polycrystalline Silicon in Substantially Closed-Loop Systems," which is incorporated herein by reference for all relevant and consistent purposes.

It is to be noted that, unless otherwise stated, the various concentrations, concentration ranges, percent inclusions, ratios, operating parameters (e.g., temperatures, pressures, conversion) and the like recited herein, are provided for illustration purposes only and therefore should not be viewed in a limiting sense. It is to be additionally noted that all various combinations and permutations of compositions, concentrations, percent inclusions ratios, components, operating parameters and the like are intended to be within the scope of and supported by the present disclosure.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A method for reacting one or more compounds in a reactor feed gas and exchanging heat between the reactor feed gas and a reactor product gas, the reaction and heat exchange occurring in a reactor apparatus comprising a reaction vessel having a wall and a reaction chamber in which the reaction occurs, the apparatus further comprising a shell and tube heat exchanger for transferring heat between the reactor feed gas and reactor product gas, the shell and tube heat exchanger comprising a shell that is in fluid communication with the reaction chamber and a tube bundle within the shell with a chamber being formed between the tube bundle and the shell, the tube bundle extending through the wall into the reaction vessel, the bundle comprising a plurality of central tubes and a plurality of peripheral tubes between the central tubes and the shell, the tubes being in fluid communication with the reaction chamber, the method comprising:
   introducing the reactor feed gas into the peripheral tubes and central tubes of the shell and tube heat exchanger;
   discharging the reactor feed gas into the reaction vessel to cause one or more compounds of the reactor feed gas to react and to form the reactor product gas;
   introducing the reactor product gas into the chamber formed between the tube bundle and the shell; and
   discharging the reactor product gas from the shell;
   wherein the reactor feed gas comprises silicon tetrachloride and hydrogen, the silicon tetrachloride reacting with hydrogen to produce the reactor product gas comprising trichlorosilane and hydrogen chloride in the reaction vessel.

2. The method as set forth in claim 1 further comprising:
   introducing the trichlorosilane discharged from the shell and tube heat exchanger into a second reaction vessel to produce polycrystalline silicon and silicon tetrachloride by-product; and
   introducing the silicon tetrachloride by-product into the peripheral and central tubes of the shell and tube heat exchanger.

3. The method as set forth in claim 2 wherein the trichlorosilane is purified prior to introduction into the second reaction vessel.

4. The method as set forth in claim 1 wherein the reactor feed gas is heated to at least about 600° C. before being discharged from the shell and tube heat exchanger.

5. The method as set forth in claim 1 wherein the reactor product gas is cooled to less than about 550° C. before discharged from the shell and tube heat exchanger.

6. A method for reacting one or more compounds in a reactor feed gas and exchanging heat between the reactor feed gas and a reactor product gas, the reaction and heat exchange occurring in a reactor apparatus comprising a reaction vessel having a wall and a reaction chamber in which the reaction occurs, the apparatus further comprising a shell and tube heat exchanger for transferring heat between the reactor feed gas and reactor product gas, the shell and tube heat exchanger comprising a shell that is in fluid communication with the reaction chamber and a tube bundle within the shell with a chamber being formed between the tube bundle and the shell, the tube bundle extending through the wall into the reaction vessel, the bundle comprising a plurality of central tubes and a plurality of peripheral tubes between the central tubes and the shell, the tubes being in fluid communication with the reaction chamber, a (1) terminal flange or (2) baffle within the reaction chamber for securing the portion of tubes that extends into the reaction chamber, and a reactor gas outlet and a product gas inlet, the reactor gas outlet being above the product gas inlet, the method comprising:

introducing the reactor feed gas into the peripheral tubes and central tubes of the shell and tube heat exchanger;

discharging the reactor feed gas into the reaction vessel to cause one or more compounds of the reactor feed gas to react and to form the reactor product gas;

introducing the reactor product gas into the chamber formed between the tube bundle and the shell; and discharging the reactor product gas from the shell;

wherein the reactor feed gas comprises silicon tetrachloride and hydrogen, the silicon tetrachloride reacting with hydrogen to produce the reactor product gas comprising trichlorosilane and hydrogen chloride in the reaction vessel.

7. The method as set forth in claim 6 further comprising:

introducing the trichlorosilane discharged from the shell and tube heat exchanger into a second reaction vessel to produce polycrystalline silicon and silicon tetrachloride by-product; and introducing the silicon tetrachloride by-product into the peripheral and central tubes of the shell and tube heat exchanger.

8. The method as set forth in claim 7 wherein the trichlorosilane is purified prior to introduction into the second reaction vessel.

9. The method as set forth in claim 6 wherein the reactor feed gas is heated to at least about 600° C. before being discharged from the shell and tube heat exchanger.

10. The method as set forth in claim 6 wherein the reactor product gas is cooled to less than about 550° C. before discharged from the shell and tube heat exchanger.

\* \* \* \* \*